Patented July 5, 1938

2,123,155

UNITED STATES PATENT OFFICE 2,123,155

COMPOSITE MATERIAL

Frazier Groff, Charleston, W. Va., assignor, by mesne assignments, to Union Carbide and Carbon Corporation, a corporation of New York No Drawing. Application July 15, 1931, Serial No. 551,061

6 Claims. (Cl. 154—43)

The invention relates to the production of articles, or stock from which to make finished articles, by combining a plurality of types of resinous materials, whereby one of the resinous materials can be caused to supply qualities in which another is deficient, all as more particularly hereinafter described.

Thermo-setting resins, for example phenol-methylene, phenol-aldehyde, phenol-furfural, urea-formaldehyde and glyptal resins, can be formed at moderate temperatures, but higher temperatures render them permanently immobile and infusible. Such resins are extensively used as molding plastics and possess desirable properties, such as insolubility, resistance to heat, mechanical strength and rigidity; but these resins also possess certain qualities which detract from their usefulness. For example, some of these resins are difficult to prepare in light colors or their colors tend to be unstable toward light; others are characterized by a low degree of electrical arc resistance; and those prepared from phenols usually retain a phenolic odor. Still other thermo-setting resins are difficult to mold and the quality of the shaped article varies with the molding conditions.

Vinyl resins, that is, resins made by polymerizing certain vinyl compounds are tough, odorless, permanently thermoplastic, easily moldable and chemically inert. They are readily prepared in stable colors of any shade, and possess a high degree of electrical arc resistance, but the heat resistance of the vinyl resins is usually inferior to that of the thermo-setting resins.

Thus, it is immediately apparent that if the desirable qualities of each type of resin could be combined in a composite material, the latter would be superior for many purposes to any product which would be made from either type of resin alone. But on attempting to mold the two types of resins together to form a composite, combining a surface of vinyl resin with a core or base of an infusible thermo-setting resin, the unexpected fact was discovered that vinyl resins molded against cured or infusible thermo-setting resins do not adhere thereto. In fact this lack of adhesion is so marked that vinyl resins may be molded in matrices formed from thermo-setting resins, which have been converted to the infusible state, in lieu of metal molds. Also, difficulties are encountered in molding vinyl resins against thermo-setting resins which are not cured but which are in the potentially reactive state, for the reason that the temperature and time required to cause the thermo-setting resins to be converted to the final infusible state differ widely from the optimum conditions for molding vinyl resins.

The present invention avoids or minimizes these difficulties and has for its principal object the provision of a process for forming composite materials including thermo-setting resins and vinyl resins.

I have found by experimentation that an object composed of infusible and non-absorbing thermo-setting resin can be provided with integral absorbent surface portion to which a vinyl resin will adhere when it is molded thereagainst. This discovery has enabled me to attain the object of the invention and to prepare composite articles by molding each resin under conditions best suited to its properties. The resultant composite combines the desirable properties of both materials.

The following examples are illustrative of the invention:

I. A plurality of sheets of paper were impregnated with potentially reactive phenolic plastic and placed together between unimpregnated sheets so that the latter formed the top and bottom layers of the assembly. The assembly was then molded at a temperature of about 150° C. to 170° C. until the thermo-setting resin was entirely converted to the infusible state. The resulting product was a laminated press board having an infusible interior, integrally joined to absorbing surfaces of untreated paper. This press board was then dipped in a 20% solution of vinyl resin in acetone, the solvent was evaporated, and the board was molded at about 130° to 140° to form a composite material having an infusible thermo-setting resin interior with a surface of vinyl resin. The vinyl resin solution may be colored with lakes, dyes or pigments.

If a thicker surface of vinyl resin is desired, the resin may be applied in the form of preformed sheet, or as powder. This can be done with or without the application of a solution of vinyl resin to the original press board. Instead of using sheets of paper which are impregnated with the thermosetting resin, untreated paper may be used and the thermosetting resin may be distributed between the layers of paper.

II. A piece of a fibrous material, such as pulp board, was treated with a solution of a potentially reactive phenolic resin. The solvent was evaporated and the board was baked until the thermo-setting resin was partially converted to the infusible state. Sheets of paper treated on one surface with a potentially reactive phenolic resin were molded against the outer surfaces of the impregnated board and the resin was converted to the infusible state. The product was a laminated article having an infusible interior, integrally joined to absorbing surfaces. This laminated paper and pulp board base was then surfaced with a vinyl resin by the application of a vinyl resin solution or molding composition, or both, as described in Example I.

The pulp board which is impregnated with a partially cured phenolic resin may be molded directly against a vinyl resin composition without the inclusion of the absorbing layers of paper. This is possible because the uncured phenolic resin is at least partially soluble in the vinyl resin and because the temperature at which the vinyl resin is molded, viz., about 130° C., is sufficient to complete the conversion of the phenolic resin to the infusible final state.

III. A mixture of a phenolic resin molding composition and a vinyl resin molding composition containing 50 parts of the phenolic resin composition and 50 parts of the vinyl resin composition was dusted over paper impregnated with a potentially reactive phenolic resin. This assembly was in turn covered with vinyl resin sheet stock or molding composition and molded at 150° C. to form a phenolic resin composite surfaced with a vinyl resin composition.

IV. A piece of felt was impregnated with a solution of a phenolic resin and rosin containing about 2 parts of rosin to 3 parts of the phenolic resin. The impregnated material was dried and baked to cure the phenolic resin. This treatment produced an impregnated base which was soft and which remained fibrous, but which was stiffer and stronger than the original material. The phenolic resin was diluted with the rosin, hence, it was possible to create a bond between the impregnated base and a vinyl resin. A vinyl resin molding composition was then molded against the upper and lower surfaces of the impregnated material to form a vinyl resin surfaced composite. This type of process may be advantageously applied to the formation of articles having a softer interior with a hard exterior of a vinyl resin composition.

V. A molding composition including both thermo-setting and vinyl resins was prepared as follows: a quantity of wood flour was treated with a solution containing the reaction product of 2 mols of formaldehyde and 1 mol. of urea. This mixture was dried and baked in an oven at 90° to 100° C. to cure the resin. Three hundred parts of this product was mixed with 250 parts of vinyl resin, 1 part of carnauba wax and 1 part of calcium stearate. The mixture was rolled for about five minutes on heated differential rolls to thoroughly incorporate the ingredients. The product after being rolled was ground and used as a general molding composition.

Many types of vinyl resins may be used to form my new material. A preferred vinyl resin is a product resulting from the polymerization of a mixture of 70% to 95% of vinyl chloride and 5% to 30% of vinyl acetate, and which is less than 30% soluble in cold (20° to 30° C.) toluene. I prefer to insure complete stability of the vinyl resin by incorporating therewith a basic stabilizing substance which does not include any acid-forming or oxidizing groups in its composition, such as alkaline earth metal salts of the fatty acids or natural or artificial acid resins, such stabilizers preferably being colloidal in nature and insoluble in water. The use of a fluxing agent, such as carnauba wax, in conjunction with the stabilizer is also advantageous.

Many modifications of my process and material are possible and are included within the invention as defined by the appended claims.

I claim:

1. A composite material comprising an infusible thermo-setting resin firmly united to a vinyl resin through an intermediate bonding surface comprising a thermo-setting resin modified by the incorporation therewith of another resinous material to which said vinyl resin is adherent.

2. A composite material comprising an infusible thermo-setting resin firmly united to a vinyl resin through an intermediate bonding surface comprising a thermo-setting resin modified by the incorporation therewith of rosin.

3. A composite material comprising an infusible thermo-setting resin firmly united to a vinyl resin through an intermediate bonding surface comprising a thermo-setting resin modified by the incorporation therewith of a vinyl resin.

4. A composite material comprising an infusible phenolic resin portion firmly united to a surface portion of vinyl resin through an intermediate bonding layer comprising about equal parts of phenolic resin and another resinous material to which said vinyl resin is adherent.

5. A composite material comprising an infusible phenolic resin portion firmly united to a surface portion of vinyl resin through an intermediate bonding layer comprising about equal parts of phenolic resin and rosin.

6. A composite material comprising an infusible phenolic resin portion firmly united to a surface portion of vinyl resin through an intermediate bonding layer comprising about equal parts of phenolic resin and a vinyl resin.

FRAZIER GROFF.